United States Patent
Rozas et al.

(10) Patent No.: US 7,734,892 B1
(45) Date of Patent: Jun. 8, 2010

(54) MEMORY PROTECTION AND ADDRESS TRANSLATION HARDWARE SUPPORT FOR VIRTUAL MACHINES

(76) Inventors: Guillermo J. Rozas, 104 Magneson Ter., Los Gatos, CA (US) 95032; Nathan Laredo, 4380 Albany Dr., #32, San Jose, CA (US) 95129

( * ) Notice: Subject to any disclaimer, the term of this patent is extended or adjusted under 35 U.S.C. 154(b) by 263 days.

(21) Appl. No.: 11/096,922

(22) Filed: Mar. 31, 2005

(51) Int. Cl.
G06F 21/00 (2006.01)
(52) U.S. Cl. .......................................... 711/208; 711/6
(58) Field of Classification Search ............... 711/6, 711/208
See application file for complete search history.

(56) References Cited

U.S. PATENT DOCUMENTS

| | | | |
|---|---|---|---|
| 4,816,991 A | | 3/1989 | Watanabe et al. |
| 5,294,897 A | | 3/1994 | Notani et al. |
| 5,317,705 A | | 5/1994 | Gannon et al. |
| 5,317,754 A | | 5/1994 | Blandy et al. |
| 5,574,878 A | * | 11/1996 | Onodera et al. ............. 711/207 |
| 6,075,938 A | * | 6/2000 | Bugnion et al. ............... 703/27 |
| 6,167,490 A | * | 12/2000 | Levy et al. ................... 711/148 |
| 6,260,131 B1 | * | 7/2001 | Kikuta et al. ................ 711/210 |
| 6,604,187 B1 | * | 8/2003 | McGrath et al. ............. 711/209 |
| 6,907,600 B2 | | 6/2005 | Neiger et al. |
| 7,111,145 B1 | | 9/2006 | Chen et al. |
| 7,278,030 B1 | * | 10/2007 | Chen et al. ................... 713/189 |
| 7,409,487 B1 | * | 8/2008 | Chen et al. ..................... 711/6 |
| 2004/0064668 A1 | | 4/2004 | Todd et al. |

OTHER PUBLICATIONS

Barham et al., Xen and the Art of Virtualization, 2003, ACM, ACM Symposium on Operating Systems Principles, pp. 164-177.*

* cited by examiner

*Primary Examiner*—Christian P Chace
*Assistant Examiner*—Jared I Rutz (57) ABSTRACT

A method for providing hardware support for memory protection and virtual memory address translation for a virtual machine. The method includes executing a host machine application on a host computer system, executing a first virtual machine application within a first virtual machine, and executing a second virtual machine application within a second virtual machine. A plurality of TLB (translation look aside buffer) entries for the first virtual machine application and the second machine application are stored within a TLB of the host computer system. At least one of the plurality of TLB entries is a global TLB entry.

26 Claims, 5 Drawing Sheets

MEMORY PROTECTION AND ADDRESS TRANSLATION HARDWARE SUPPORT FOR VIRTUAL MACHINES

TECHNICAL FIELD

The present invention relates generally to digital computer systems. More specifically, the present invention pertains to efficiently implementing support for a virtual machine and applications executing within the virtual machine.

BACKGROUND ART

Many types of digital computer systems are used to implement virtual machines and support for applications that execute within virtual machines. Generally, the term "virtual machine" refers to a computer system image or process that supports multiple computer system images/processes. Each image can contain an operating system and its associated applications, or alternatively, each image may have the same operating system or different respective operating systems. Some prior art computer systems are specifically built with hardware circuits that support virtual machine capability. These prior art solutions are limited in their performance and usefulness due to fact that their software support for virtual memory requires very slow software-based emulation while the hardware support does not cache virtual-address-to-physical-address translations efficiently in multi tasking, multi context environments. Thus what is required is a solution that can efficiently implement hardware support for virtual machine memory protection and address translation and for applications executing within virtual machines.

DISCLOSURE OF THE INVENTION

Embodiments of the present invention provide a method and system for implementing hardware support for memory protection and address translation for a virtual machine.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention implement a method and system for providing hardware support for virtual memory address translation for two or more virtual machines. For example, in one embodiment, a process for providing hardware support for memory protection and virtual memory address translation for a virtual machine is implemented by executing a host machine application on a host computer system, executing a first operating system within a first virtual machine, and executing a second operating system within a second virtual machine. The first and second operating systems support a respective plurality of applications, each having different contexts. A plurality of TLB (translation look aside buffer) entries for the first virtual machine application (e.g. the first operating system) and the second virtual machine application (e.g., the second operating system) within a common TLB of the host computer system.

The TLB entries each include respective context identifiers and global indicators that enable a unique identification of each the TLB entries. This unique identification prevents virtual address aliasing problems between the applications of the different operating systems of the different virtual machines, and prevents unnecessary flushes of the TLB cache entries. Embodiments of the present invention and their benefits are further described below.

Notation and Nomenclature

Some portions of the detailed descriptions which follow are presented in terms of procedures, steps, logic blocks, processes, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system (e.g., system 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Present Invention

Figure 1:
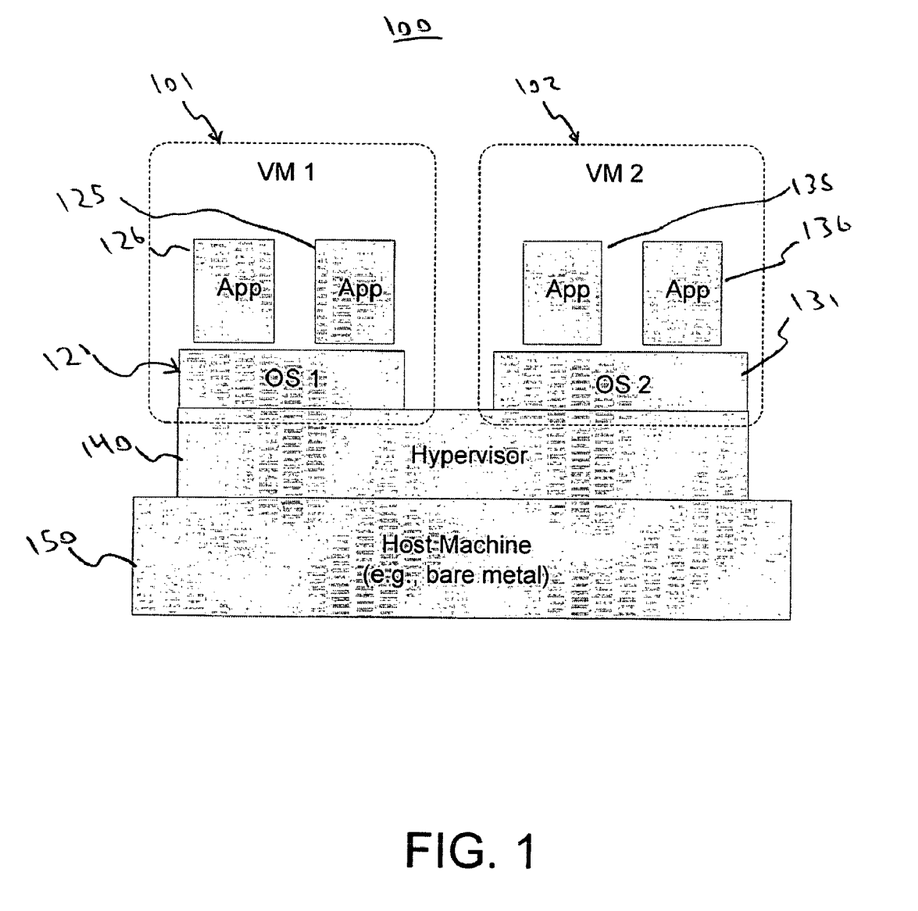
FIG. 1 shows a diagram of a computer system configured for supporting multiple virtual machines and virtual machine applications in accordance with one embodiment of the present invention.

FIG. 1 shows a diagram depicting an architecture of a computer system 100 in accordance with one embodiment of the present invention. As depicted in FIG. 1, the computer system 100 includes a first virtual machine 101 and a second virtual machine 102. The first and second virtual machines 101-102 each execute on a host machine application, referred to as a hypervisor 140, which itself executes directly on the host computer system 150, often referred to as the "bare metal" machine.

The computer system 100 embodiment of FIG. 1, diagrams a process for providing hardware support for memory protection and virtual memory address translation for a plurality of virtual machines, in this case, virtual machines 101 and 102. The virtual machines 101-102 execute on top of the host machine application 140, or the "hypervisor". The hypervisor 140 functions as a virtualization layer, or software-based hardware abstraction layer that controls physical resources and firmware resources (e.g., BIOS) of the real computer system hardware (e.g., motherboard, IO devices, peripherals, etc.). Only the hypervisor 140 is exposed to the "bare machine interface" of the computer system 100 (e.g., host machine 150). Thus, only the hypervisor 140 comprises the true "kernel" having final control of the host machine 150.

Alternatively, in one embodiment, the hypervisor 140 can be implemented as an application that itself runs on top of a host operating system and uses the host operating system (e.g., and its kernel) to interface with the host machine 150.

The hypervisor presents programs executing within the virtual machines 101-102 with the illusion that they are in fact executing upon a real physical computer system (e.g., bare metal). The programs executing within the virtual machines 101-102 can be themselves operating systems which further support other application programs, such as the operating systems 121 and 131 and the application programs 125-126 and 135-136. In general, all of these programs need to be provided, or otherwise negotiate, the consent of the hypervisor 140 in order to access the functionality of the host machine 150 to perform, for example, user IO, and the like.

The computer system embodiment 100 shows a special case where the virtual machines 101-102 each execute their own respective operating systems 121 and 131. As described above, the hypervisor presents programs executing within the virtual machines 101-102 with the illusion that they are in fact executing upon a real physical computer system. Accordingly, the operating systems 121 and 131 will function most efficiently when provided support for their own respective virtual memory management systems. These systems assume the presence of a dedicated host machine TLB (translation lookaside buffer). However, instead of providing a pure software simulation of the dedicated host machine TLB, which would be excessively slow, embodiments of the present invention utilize a common hardware-based TLB (e.g., within the host machine 150) to support the virtual memory systems of both operating systems 121 and 131.

Figure 2:
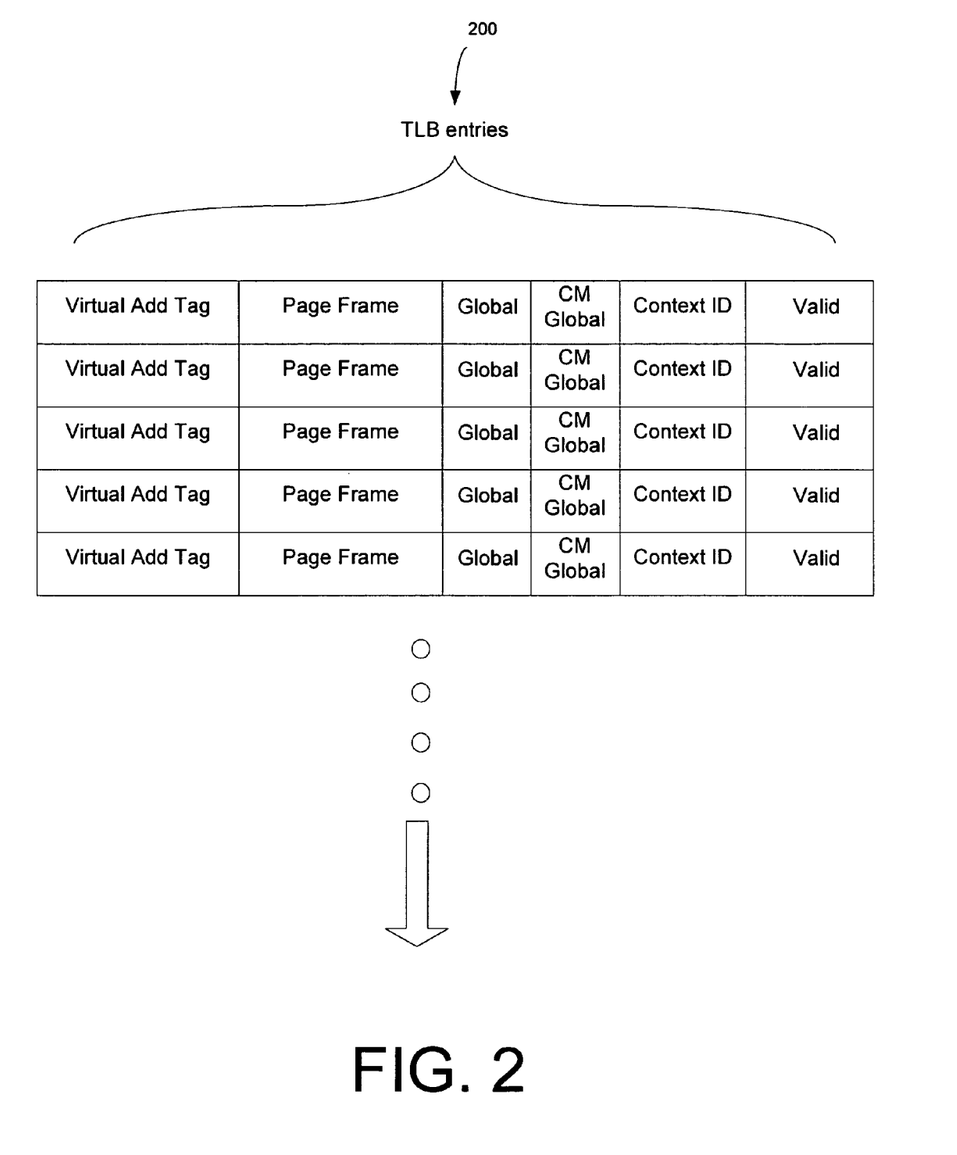
FIG. 2 shows a diagram of a plurality of entries of a TLB (translation lookaside buffer) in accordance with one embodiment of the present invention.

FIG. 2 shows a diagram of a plurality of entries 200 of a TLB (translation lookaside buffer) in accordance with one embodiment of the present invention. As depicted in FIG. 2, the TLB entries 200 show the typical TLB entries which are cached within the TLB of the CPU of the host machine 150.

Each of the entries comprise a virtual address tag, a page frame, a global indicator, a context identifier, and a validity indicator, as shown. An optional cross-machine global indicator can also be included as shown.

Generally, a TLB comprises a cache that tracks the most recent virtual-address-to-physical-address translations. These translations are stored as entries within a buffer. For high-performance, the buffer is usually a CAM-based (content-addressable memory) buffer to minimize latency. As known by those skilled in the art, when a virtual memory address is requested, the TLB is checked to determine whether the corresponding physical address translation is resident. If the entry is resident, the translation is fetched from the TLB. If the entry is not resident, the translation must be determined from one or more virtual memory page tables (e.g., walking the page tables), which consumes considerably more time.

Upon retrieval from the virtual memory page tables, the translation is stored within the TLB as a new entry, so that it is available for future requests for that same virtual address. Thus, as the applications of the virtual machines 101-102 execute, they each build up a set of virtual-address-to-physical-address translations which are stored as entries 200 of the TLB. Generally, to make the best use of the limited space of the TLB, the entries 200 are replaced on an LRU (least recently used) basis.

In accordance with embodiments of the present invention, the TLB entries 200 are "tagged" such that the TLB of the host machine 150 can include entries for different applications executing within different contexts. In the FIG. 2 embodiment, the entries 200 are tagged with respect to their context ID so that upon a switch from one context to another, the TLB does not have to be completely invalidated (e.g., flushed). In this manner, the context ID allows TLB entries from different applications (e.g., applications 125-126) to coexist. Thus, for a valid entry match, each TLB lookup must match not only the virtual address and valid bits, but also match the context-ID, in order to be successful.

In addition to using context identifiers, the TLB entries 200 also have global indicators indicating those entries which are valid for all processes, or contexts. In one embodiment, the global indicator comprises a bit (e.g., G-bit) in each TLB entry, and specifies that a particular entry matches all contexts.

In one embodiment, in addition to the global indicator, the cross-machine global indicator (e.g., CM global) is also used to further identify those entries belonging to the processes of the various virtual machine. For example, the cross-machine global indicator can be implemented as a single bit (e.g., a universal bit) signifying the particular entry is valid for all processes and all contexts of all virtual machines.

Figure 3:
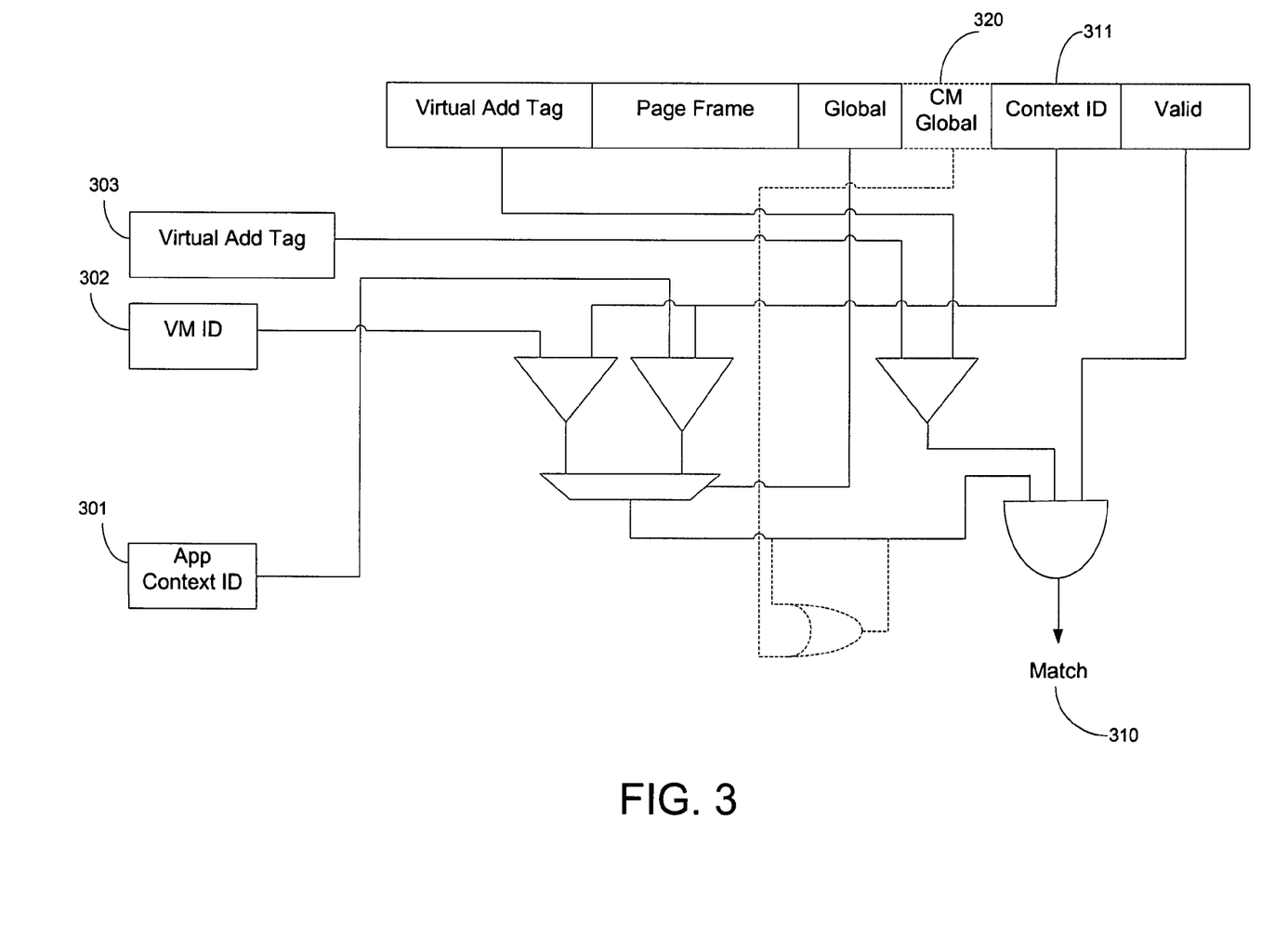
FIG. 3 shows a diagram depicting TLB matching hardware in accordance with one embodiment of the present invention.

FIG. 3 shows a diagram depicting TLB matching hardware 300 in accordance with one embodiment of the present invention. As depicted in FIG. 3, the TLB matching hardware 300 shows the logical operation of TLB match detection when matching virtual addresses with physical addresses from different virtual machines executing on a common host machine.

As described above, the hypervisor 140 presents programs executing within the virtual machines 101-102 with the illusion that they are in fact executing upon a real physical computer system. Note that each of these machine images (e.g., virtual machine 101 and virtual machine 102) will have its own global pages and process contexts, and what was previously a global page identifier is no longer global in that it is no longer common to all processes/address spaces respect to the host machine 150, but only to the subset running on the same (virtual) machine image.

Embodiments of the present invention allows a single bit of global-page indicator to be multiplexed along multiple machine images, or virtual machines, so that each machine image has its own set of 'global' pages with TLB hardware support for fast context switching. In the FIG. 3 embodiment, the TLB entries and page table entries each comprise a virtual address tag, a page frame, a global indicator, a context identifier, and a validity indicator, as shown in FIG. 2 and FIG. 3, and the global indicator comprises a global bit. The context ID field may be in both TLB entries and page table entries (e.g., if architecturally visible), or only in TLB entries (e.g., if only visible micro-architecturally). In the present embodiment, the context-ID register is extended to have two fields, namely the per-process context-ID field (e.g., App Context ID 301), and the machine-instantiation/virtual machine context-ID field (e.g., VM ID 302). The virtual address tag 303 functions conventionally.

As the logic depicted in FIG. 3 shows, a match 310 occurs only when the address is present (virtual address tags match) and the TLB entry is valid. If the TLB entry has the global bit clear (e.g., marked not global), the TLB entry's context-ID field must match the per-process application context-ID field 301 of the context-ID register. If the TLB entry has the global bit set (e.g., marked global), the TLB entry's context-ID field 311 must match the machine-instantiation virtual machine ID field 302. On a context switch within the same virtual machine (e.g., virtual machine 101 or virtual machine 102), only the per-process context-ID field 301 is changed. On a "virtual machine switch", both the per-process fields 301 and machine-instantiation context-ID fields 302 are switched. In one embodiment, each machine instantiation (e.g., the host machine 150 or virtual machine 101-102) has its own machine-instantiation field which is in effect when that machine is active. In so doing, embodiments of the present invention can nest virtual machines recursively (e.g., virtual machines on virtual machines on virtual machines, and so on) on a physical host machine.

It should be noted that the virtualization layer (e.g., hypervisor 140) manages the machine-instantiation IDs and can invalidate (e.g., flush) the relevant parts of the hardware TLB as necessary when re-using a machine-instantiation field.

It should be noted that the virtualization layer/hypervisor 140, in conjunction with the operating systems 121 and 131, manage a global pool of regular context IDs so that no two distinct address spaces, across virtual machine instantiations, share a context ID. This can be done through hard partitioning, where for example each machine instantiation gets a subset of the space, thereby limiting the number of machine instantiations, or through dynamic partitioning, where for example global allocation and partitioning is handled on-the-fly.

It should be noted that the context ID field 311 of a TLB entry is filled when the TLB entry is inserted into the TLB. The process of filling the context ID field is substantially similar to the comparison performed when checking for validity. For example, if the TLB entry being inserted into the TLB is global, the VM ID field (e.g., VM ID 302) of the context-id register is inserted into the context-ID field of the TLB entry. If the TLB entry being inserted is not global, the context-ID field of the context-ID register is inserted into the context-ID field of the TLB entry.

As described above, in one embodiment, TLB entries can be marked as global across multiple virtual machines. In such an embodiment, an additional indicator/bit can be incorporated (e.g., the cross-machine global indicator, or CM global) that would mark a TLB entry as being global across multiple virtual machines. For example, such a cross-machine global indicator can be used to mark one or more TLB entries as belonging to, or related to, interaction with the virtualization layer/hypervisor (e.g., hypervisor 140). The logic depicted in FIG. 3 can be modified to incorporate the CM global ID 320 as shown by the dotted lines. Fast hardware based context switching support would thus be provided to all virtual machines needing access to the global multi-machine entries. In this manner, the global indicator can mark one or more TLB entries as global within one virtual machine, and the cross machine global indicator can mark one or more TLB entries as global across all virtual machines.

Figure 4:
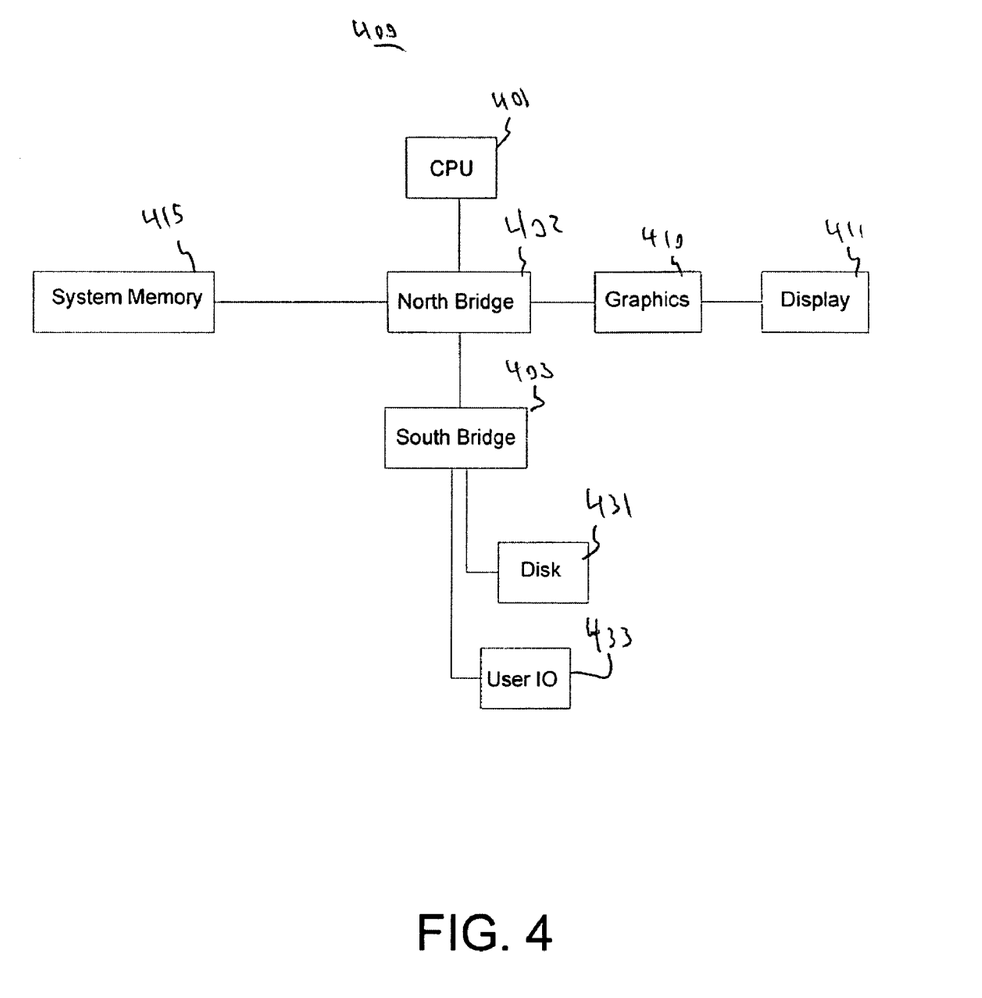
FIG. 4 shows a diagram of a computer system platform in accordance with one embodiment of the present invention.

With reference now to FIG. 4, a computer system 400 in accordance with one embodiment of the present invention is shown. Computer system 400 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 400) and are executed by the CPU 401 of system 400. When executed, the instructions cause the system 400 to implement the functionality of the present invention as described above.

In general, system 400 comprises at least one CPU 401 coupled to a North bridge 402 and a South bridge 403. The North bridge 402 provides access to system memory 415 and a graphics unit 410 that drives a display 411. The South bridge 403 provides access to a coupled disk drive 431 and various user I/O devices 433 (e.g., keyboard, mouse, etc.) as shown.

Figure 5:
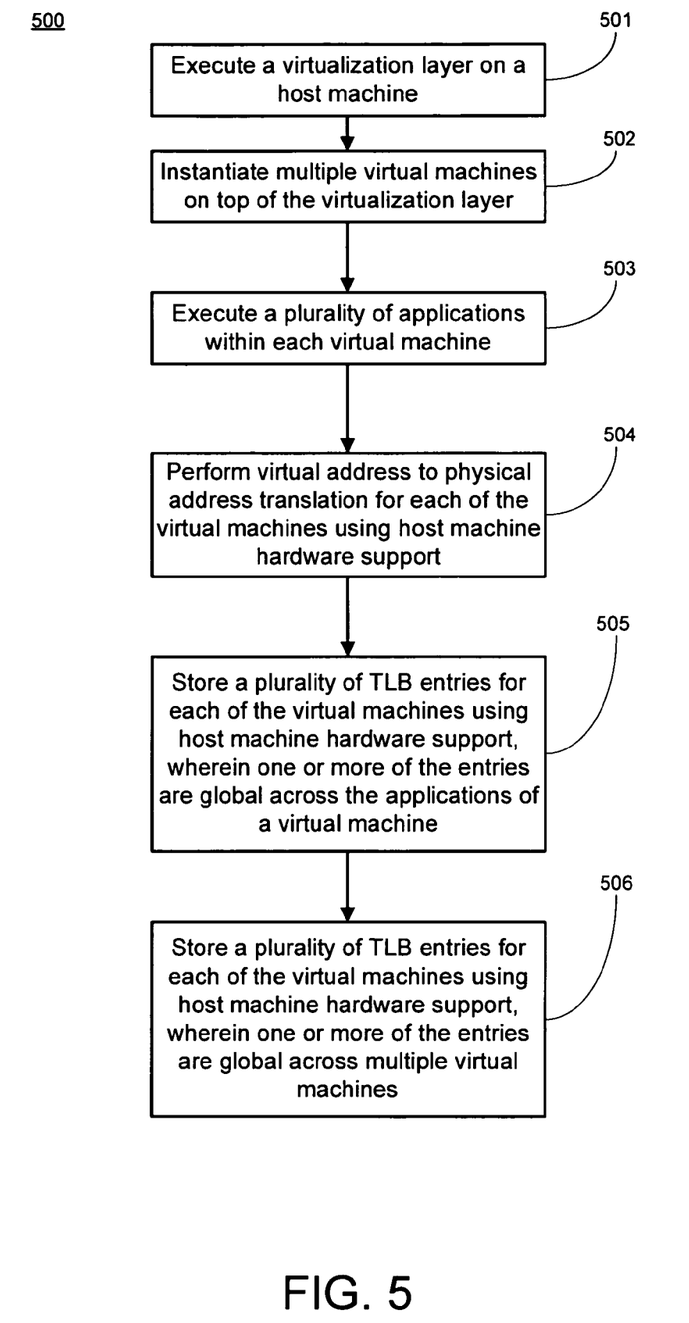
FIG. 5 shows a flowchart of the steps of a process in accordance with one embodiment of the present invention.

FIG. 5 shows a flowchart of the steps of a process 500 in accordance with one embodiment of the present invention. As depicted in FIG. 5, process 500 depicts the operating steps of a virtual machine instantiation and support process (e.g., system 100 of FIG. 1) as implemented on a computer system platform (e.g., system 400 of FIG. 4).

Process 500 begins in step 501, where a virtualization layer, or hypervisor 140, is executed on the host machine. In step 502, multiple virtual machines (e.g., virtual machines 101 and 102) are instantiated on top of the virtualization layer. In step 503, a plurality of applications are executed within each virtual machine (e.g., applications 125 and 126). In step 504, virtual address to physical address translation is performed for each of the virtual machines using host machine hardware support. In step 505, a plurality of TLB entries for each of the virtual machines are stored using the host machine hardware support (e.g., the host machine TLB). One or more of these entries are marked as global across the applications of one of the virtual machines. As described above, embodiments of the present invention can support global access to a TLB entry by all applications of one of the virtual machines. In step 506, a plurality of TLB entries for each of the virtual machines are stored using host machine hardware support, wherein one or more of the entries are global across multiple virtual machines. As described above, embodiments of the present invention can support global access to TLB entries across all virtual machines, and thus all virtual machine operating systems/applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method, comprising:
executing a first virtual machine application within a first virtual machine;
executing a second virtual machine application within a second virtual machine; and
storing a plurality of TLB (translation look aside buffer) entries for the first virtual machine application and the second virtual machine application within a TLB of the host computer system, wherein at least one of the plurality of TLB entries is a global TLB entry, and wherein ones of the entries have respective context identifiers and have respective machines instantiation fields for nesting virtual machines recursively, and wherein the respective context identifiers are managed via hard partitioning.

2. The method of claim 1, wherein a global indicator is used to indicate the global TLB entry.

3. The method of claim 1, wherein the at least one global TLB entry is global across the first virtual machine or the second virtual machine.

4. The method of claim 1, wherein the at least one global TLB entry is global across the first virtual machine and the second virtual machine.

5. The method of claim 4, wherein identifying a respective virtual machine application for the global TLB entry is configured to avoid a TLB flush upon a context switch between the first virtual machine application and the second virtual machine application.

6. The method of claim 1, wherein a context identifier is used to indicate a context for the at least one global TLB entry.

7. The method of claim 1, further comprising:
identifying a respective virtual machine application for the global TLB entry by using a context identifier for the global TLB entry and a global indicator for the global TLB entry.

8. The method of claim 1 wherein the host machine application is a hypervisor that executes on the host machine.

9. The method of claim 1 wherein the first virtual machine application is a first operating system and the second virtual machine application is a second operating system.

10. The method of claim 9, wherein the first operating system supports a first plurality of applications having different contexts and the second operating system supports a second plurality of applications having different contexts.

11. The method of claim 10 wherein the TLB entries include respective context identifiers and global indicators enabling an unique identification of the TLB entries to provide physical address translation for virtual addresses from both the first operating system and the second operating system.

12. A system, comprising:
a processor architecture; and
an address translation cache configured to implement a translation look aside buffer, with the address translation cache in conjunction with the processor architecture configured to:
execute a first virtual machine application within a first virtual machine;
execute a second virtual machine application within a second virtual machine; and
store a plurality of TLB (translation look aside buffer) entries for the first virtual machine application and the second virtual machine application within a TLB of the host computer system, wherein at least one of the plurality of TLB entries is a global TLB entry, and wherein each of the TLB entries have respective context identifiers and have respective machines instantiation fields for nesting virtual machines recursively, and wherein the respective context identifiers are managed via dynamic partitioning.

13. The system of claim 12, wherein a global indicator is used to indicate the global TLB entry.

14. The system of claim 12, wherein the at least one global TLB entry is global across the first virtual machine or the second virtual machine.

15. The system of claim 12, wherein the at least one global TLB entry is global across the first virtual machine and the second virtual machine.

16. The system of claim 12, wherein a context identifier is used to indicate a context for the at least one global TLB entry.

17. The system of claim 12, further comprising:
identifying a respective virtual machine application for the global TLB entry by using a context identifier for the global TLB entry and a global indicator for the global TLB entry.

18. The system of claim 12, wherein identifying a respective virtual machine application for the global TLB entry is configured to avoid a TLB flush upon a context switch between the first virtual machine application and the second virtual machine application.

19. The system of claim 12 wherein the first virtual machine application is a first operating system and the second virtual machine application is a second operating system.

20. The system of claim 19, wherein the first operating system supports a first plurality of applications having different contexts and the second operating system supports a second plurality of applications having different contexts.

21. The system of claim 20 wherein the TLB entries include respective context identifiers and global indicators enabling an unique identification of the TLB entries to provide physical address translation for virtual addresses from both the first operating system and the second operating system.

22. A method, comprising:
executing a first operating system within a first virtual machine, wherein the first operating system supports a first plurality of applications having different contexts;
executing a second operating system within a second virtual machine, wherein the second operating system supports a second plurality of applications having different contexts; and
storing a plurality of TLB (translation look aside buffer) entries for the first virtual machine application and the second virtual machine application within a TLB of the host computer system, wherein the TLB entries include respective context identifiers and global indicators enabling an unique identification of the TLB entries per virtual machine and have respective machines instantiation fields for nesting virtual machines recursively, and and wherein the respective context identifiers are managed via dynamic partitioning.

23. The method of claim 22, further comprising:
providing physical address translation for virtual addresses from both the first operating system and the second operating system by using the unique identification of the TLB entries.

24. The method of claim 23, wherein at least one of the plurality of TLB entries is a global TLB entry.

25. The method of claim 24, wherein the at least one global TLB entry is global across the first virtual machine or the second virtual machine.

26. The method of claim 24, wherein the at least one global TLB entry is global across the first virtual machine and the second virtual machine.

* * * * *